United States Patent [19]

Portinari et al.

[11] 4,279,470
[45] Jul. 21, 1981

[54] OPTICAL CABLE ELEMENTS

[75] Inventors: Antonio Portinari, Sesto San Giovanni; Sergio Longoni, Milan, both of Italy

[73] Assignee: Industrie Pirelli Societa per Azioni, Milan, Italy

[21] Appl. No.: 106,034

[22] Filed: Dec. 21, 1979

Related U.S. Application Data

[62] Division of Ser. No. 898,081, Apr. 20, 1978, Pat. No. 4,212,097.

[30] Foreign Application Priority Data

May 4, 1977 [IT] Italy .................. 23147 A/77

[51] Int. Cl.³ .................................. G02B 5/16
[52] U.S. Cl. ..................... 350/96.23; 174/101
[58] Field of Search ............. 350/96.23, 96.24, 96.25, 350/96.26, 96.30; 174/70 R, 101, 110 AR, 110 SR, 110 PM, 110 V; 29/234, 235, 450, 781

[56] References Cited

U.S. PATENT DOCUMENTS

| | | | |
|---|---|---|---|
| 3,766,307 | 10/1973 | Andrews, Jr. | 174/47 |
| 3,955,878 | 5/1976 | Nowak | 350/96.23 |
| 4,153,332 | 5/1979 | Longoni | 350/96.23 |
| 4,201,607 | 5/1980 | Rautenberg et al. | 350/96.23 X |
| 4,212,097 | 7/1980 | Portinari et al. | 29/450 |

FOREIGN PATENT DOCUMENTS

| | | |
|---|---|---|
| 889624 | 6/1953 | Fed. Rep. of Germany . |
| 2505621 | 8/1975 | Fed. Rep. of Germany ........ 350/96.23 |
| 2507648 | 9/1976 | Fed. Rep. of Germany . |
| 1274999 | 9/1961 | France . |
| 52-10738 | 1/1977 | Japan ..................... 350/96.23 |

Primary Examiner—John K. Corbin
Assistant Examiner—John D. Lee
Attorney, Agent, or Firm—Brooks, Haidt, Haffner & Delahunty

[57] ABSTRACT

A method of manufacturing elements for an optical cable, such elements including a tube of an elastic material, e.g. a synthetic resin or an elastomer, which loosely encloses one or more optical fibers. Preferably, the fiber or fibers are longer than the enclosing tube and the tube is filled with a material which prevents the migration of water, etc. The tube in mechanically stabilized form and the optical fiber or fibers are advanced toward a traction zone where the tube is pulled. Prior to the traction zone, the tube is slit or cut longitudinally through one thickness of the wall, the cut edges are spread apart and the optical fiber or fibers are inserted into the tube through the gap between the cut edges. Optionally, filling material is also inserted into the tube through such gap or a downstream gap subsequently formed. The tube-optical fiber assembly follows a straight line downstream of traction zone to a collecting point. The tube may be tensioned downstream of the traction zone either by a pulling wheel or the collecting means. Also, apparatus for performing the method including slitting or cutting means, rectilineal traction means, collecting means and optionally, separate pulling means following the traction means.

8 Claims, 5 Drawing Figures

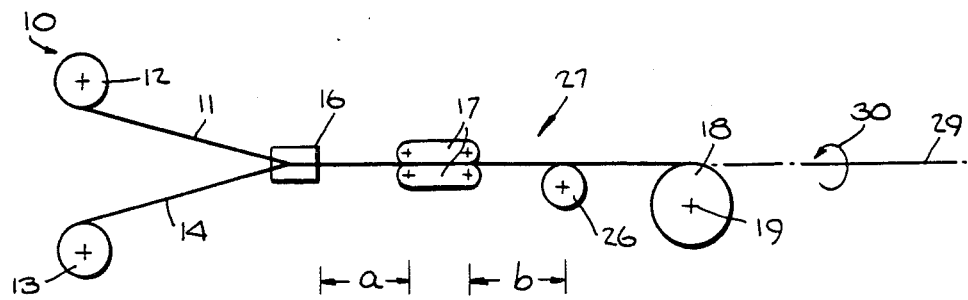
Fig.1.
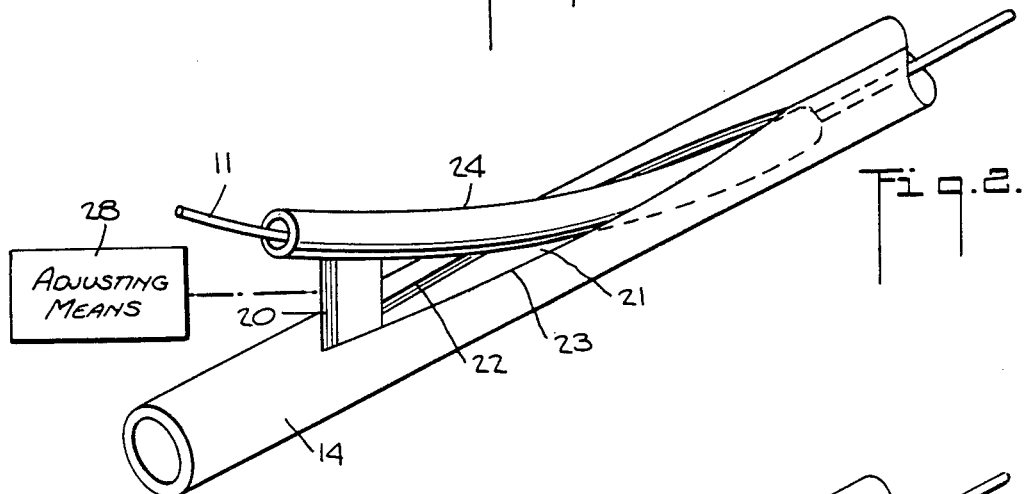
Fig.2.
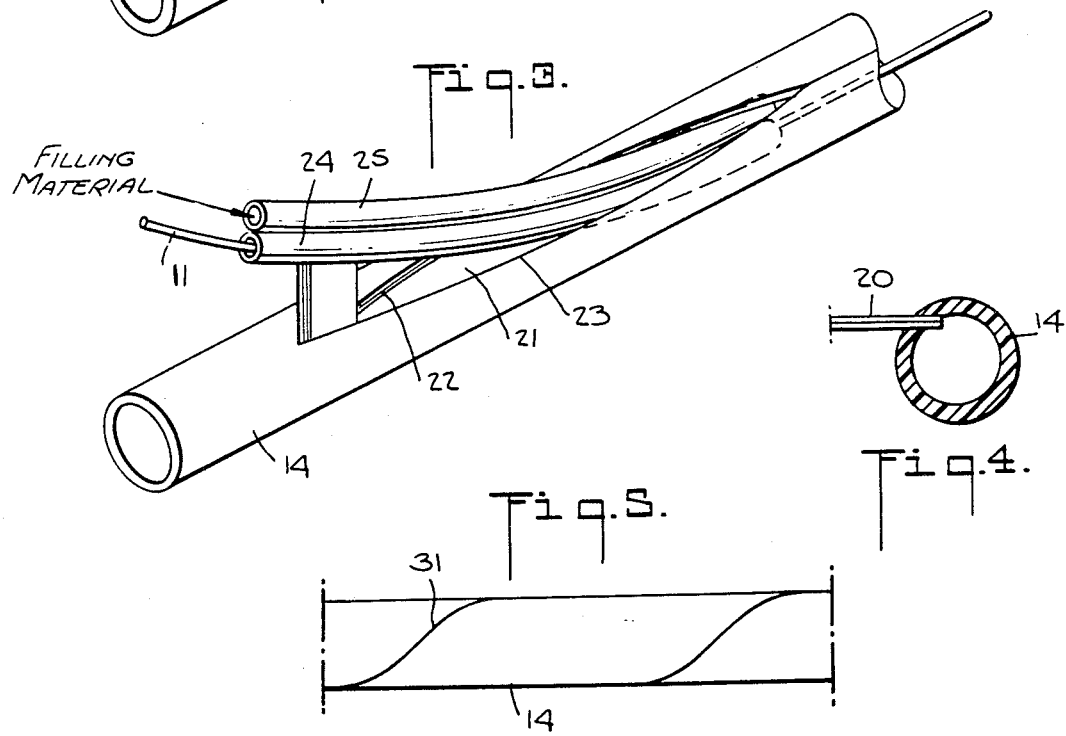
Fig.3.
Fig.4.
Fig.5.

OPTICAL CABLE ELEMENTS

This is a division of application Ser. No. 898,081, filed Apr. 20, 1978, now U.S. Pat. No. 4,212,097.

The present invention relates to a method especially suited for producing unitary elements comprising optical fibers, such elements being employed for the construction of telecommunication cables, to a plant for carrying out the method and to the unitary element that is produced.

The expression a "unitary element" is intended to mean a cylindrical elongated body of the type described in United States patent application Ser. No. 583,780, filed June 4, 1975, entitled "Sheathed Optical Fiber Element and Cable and Process for Production Thereof" and assigned to the assignee of this application, now U.S. Pat. No. 4,153,332, and it comprises one or more optical fibers, either bare or clad by at least one protective layer, which are layed up in a sheath preferably of a plastic material (e.g., polyethylene, polypropylene, etc.) or an elastomeric material (e.g. cross-linked polyethylene) in a tubular form, such a sheath being referred to herein as a "tube". The tube has an internal surface that does not adhere to the external surface of said fiber or fibers, and the internal diameter of the tube is greater than the external diameter of said fibers, or of a hypothetical circle circumscribing said fibers, so that the said fiber (or fibers) lies loose inside the tube.

In a preferred embodiment, the said fiber (or fibers) possesses a greater length than the tube containing it. This construction allows for loading of the unitary element with a greater axial force than the one to which a single fiber (or the fibers) could be subjected.

The unitary element has a long length, that is, it has a body having longitudinal dimensions that are very much greater than the transverse dimensions. The length of the unitary element is, in fact, preferably of the order of one kilometer, whereas the diameter measured on the external surface of the tube is about a few millimeters. The reason for this is that telecommunication cables have a long length, and it is desirable to make such cables without joints, except at their ends, because of signal losses at such joints.

In said application Ser. No. 583,780, there is described a method for making such a unitary element. This method, in which a tube is extruded directly onto the optical fiber (or fibers) and is cooled immediately after, is characterized by the fact that it comprises the step of lubricating the said fiber (or fibers) upstream of the extrusion phase of the tube with an appropriate antiadhesive. Said tube is extruded so as to have an internal diameter such as to maintain, as an ambient temperature, a diameter greater than the external diameter of the enclosed fiber (or fibers).

This method has, to date, given excellent experimental results. Nevertheless, there is a reasonable doubt as to the method being any longer advisable because of the high precision technological progress in the field of telecommunication cables with optical fibers, and in particular, because of the adoption of miniature tubes, i.e. with tubes having inside diameters of smaller size. However, even with such miniature tubes the internal diameter is greater than the fiber (or fibers) enclosed in the tube.

It could, for example, happen that in spite of the narrow path of the advancing trajectory of the fiber (or fibers) and of the tube being extruded around it along the production line of the unitary element, minute oscillations may place the internal tube walls into contact, at one or more points, with the fiber (or fibers) thereby entrapping, or causing local adhesions, of the fiber and the tube. The succeeding cooling of the tube gives rise to a contraction force which is applied to the fiber (or fibers) and which cause rupture of the fiber (or fibers) or a variation in the transmission characteristics of the fiber (or fibers).

At times, moreover, it may be necessary to fill the tube with a filling material that does not allow migration to take place inside the tube, such as migration of moisture or any other contaminating liquids. Until the present invention, a working procedure was quite unknown for permitting satisfactory filling of the tube.

One object of the invention is to provide a process for producing unitary elements, which does not have the drawbacks described above.

Another object of this invention is to eventually permit the filling of the unitary element with an appropriate material during the production phase.

A further object of the invention is a plant that allows for the production of unitary elements with the method described.

More specifically, an object of the invention is a method for producing a unitary element consisting of an optical fiber (or several optical fibers) contained in a loose manner, in a tube, such unitary element being especially suited for telecommunication cables, and the method comprising the steps of:

(1) feeding, with a uniform advancement, of a tube which has been previously extruded and stabilized;

(2) applying a first traction to a zone of the tube for putting the part of the tube upstream under tension and for causing the tube to follow a straight path downstream of the traction zone;

(3) cutting the tube longitudinally, and continuously along its length, to a depth that is equal to the thickness of the tube wall on the cutting plane;

(4) a first separating of the edges of the tube so formed immediately downstream of the cutting operation to provide a gap therebetween;

(5) inserting into the tube through the said gap, at least said fiber (or fibers), said fiber also advancing in a uniform manner;

(6) uniting the cut edges, by exploiting the elasticity of the tube material, at least downstream of the inserting of the fiber (or fibers), but upstream of the said zone of application of the said first traction; and (7) collecting the said tube with the fiber (or fibers) inserted inside (the unitary element).

A preferred embodiment of the method, according to this invention also comprises the step of feeding a filling material into said tube through said gap.

A further object of the invention is a plant especially for carrying out the method described, characterized by the fact that it comprises:

(1) a feeder for said fiber (fibers) set parallel to (2) a feeder for said tube, this being in series with (3) a means suited for exercising a cutting action on the tube, and at least (4) a means for separating the edges of the tube as they are formed and also with (5) a means for guiding said fiber (or fibers) into the tube, followed downstream by (6) a rectilinear traction means, which in its turn is followed by at least (7) a collecting means.

In a further preferred embodiment of the plant according to the invention, said feeder of the tube, said rectilinear traction means, and said collecting means, rotate with a uniform movement around an axis lying on the straight path of the said fiber (or fibers) so as to form a longitudinally non-linear, e.g. helical, cut line.

A further preferred embodiment for the plant includes a means capable of feeding a filling material into the said tube through said gap. Alternatively, a second gap can be formed downstream of the gap into which the fiber (or fibers) is inserted, and the filling material can be inserted into the tube through the second gap.

The invention also comprises a unitary element obtained with the said method and is characterized by the fact that the tube has a single cut extending continuously for the length of the tube, such cut having a depth equal to only one tube wall thickness.

The objects and advantages of the invention will be apparent to those skilled in the art from the following description of the presently preferred embodiments thereof, which description would be considered in conjunction with the accompanying drawings, in which:

FIG. 1 illustrates schematically the production line of a plant capable of carrying out the method of the invention;

FIG. 2 is a schematic perspective view which illustrates means for carrying out certain phases of the invention;

FIG. 3 is similar to FIG. 2 and illustrates a further means for carrying out certain phases of the method of the invention.

FIG. 4 is a fragmentary cross-sectional end view of a modified form of the means shown in FIG. 2; and FIG. 5 is a plan view of an element made in accordance with the invention which is cut along a helical line.

The plant, represented schematically in FIG. 1, comprises at least one feeder for the optical fiber or fibers 11. In a special case, this feeder 10 is a bobbin 12. Parallel to the bobbin 12, there is a feeder 13 for a tube 14, preferably of a thermoplastic material or of an elastomeric material having sufficient elasticity as described hereinafter, and having an internal diameter greater than the external diameters of the fiber or group of fibers 11. The illustrated feeder 13 is a bobbin.

The tube 14 is previously stabilized. This means that it has undergone a thermal and even a mechanical treatment that has brought the material constituting the tube to an optimal condition of stability and resistance. The preferred mechanical treatment is a stretching process that gives to the tube molecules a preferential orientation that improves the mechanical quality.

In series with the feeders 10 and 13 (FIG. 1), there is shown a block 16 that represents an assembly for cutting the tube 14 and inserting the optical fiber or fibers with the tube 14. Such assembly 16 includes a cutting means 20 in the form of a cutting blade (FIG. 2), capable of cutting the tube 14 to provide a longitudinally extending cut or slit therein which extends from the outer periphery to the inside of the tube. Preferably, the means 20 is adjustable by the means 28 for calibrating, in the desired manner, the desired cut in such a way that the cut corresponds to a depth equal to the thickness of the tube wall. By tube wall thickness is meant the thickness which is found along the cutting plane. Preferably, the adjusting means 28 also includes means for varying the angle of the cutting means 20 with respect to a plane passing through the axis of the tube 14 and hence, the cut inclination and the assembly includes a separating means 24 for simultaneously separating the edges 22 and 23 of the cut and a suitably shaped guiding means for the fiber or fibers 11. In the plant illustrated, the separating means 24 is also the fiber guiding means, but the separating means can be distinct from the guiding means. The guiding means 24 preferably is a metallic capillary tube.

The assembly represented by the block 16 can also comprise a means 25 capable of inserting a filling material into the tube 14 through the gap 21 (see FIG. 3). The means 25 illustrated is a capillary tube parallel to the metallic capillary tube 24 and is made of a suitable material having properties that are compatible with the nature of the filling material.

Instead of inserting the filling material in the gap 21 which receives the fiber or fibers 11, the edges 22 and 23 can be separated downstream of the gap 21 to provide a second gap, and the filling material can be inserted through such second gap created for this purpose.

Downstream of the assembly 16, there is a rectilinear traction means 17, followed, in turn, by at least a collecting means 18. The collecting means 18, in the plant illustrated, is a bobbin which rotates around its own axis 19. In the preferred embodiment illustrated, between the rectilinear traction means 17 and the bobbin 18, there is provided a traction controlling device 26, such as a pulling wheel, for exerting a pulling and stretching force on the tube 14. Alternatively, the traction controlling device 26 can be omitted, and the collecting bobbin 18 can be provided with means for regulating the pull on the element in the collecting phase.

The bobbin 13 feeds the tube 14 uniformly, and the rectilinear traction 17 applies, on the tube that is passing through it, a first traction force that puts the part of the tube upstream of the means 17 under tension, and defines a rectilinear path for the tube downstream of the means 17.

Upstream of the rectilinear traction means 17, the tube, under tension, passes through the field of action of the cutting means 20 (see FIG. 2) that cuts it in the longitudinal sense and continuously along the length of the tube 14 and, for example, (but not necessarily) along a generatrix. In practice, "longitudinal" signifies a line that extends along almost the entire tube length, but it can also be other than a rectilinear line. The cut which is made has a depth equal to the thickness of the tube 14 on the cutting plane. The cutting plane can be radial or tangential to the internal circumference of the tube, as shown in FIG. 4, or at any angle which will produce a cut extending from the outer periphery to the inner wall of the tube 14.

As the cutting means 20 cuts the tube 14, the separating means 24, immediately downstream of the cutting means 20, separates, preferably simultaneously, the edges 22 and 23. The separating means 24, which, in the example illustrated, is a metallic capillary tube acts also as a guiding means for the fiber or fibers 11, and said guiding means penetrates, leading end first, into the tube 14, through the gap 21.

The optical fiber or fibers 11, unwinding with a uniform movement, advance into the inside of the tube 14 by passing through the capillary tube 24.

Whenever it is required to fill the unitary element that is being produced, a filling material of a type known in the art is inserted into the tube 14 by the means 25 (see FIG. 3) through the gap 21, or as explained previously through a second gap used for the same purpose.

The gap 21 is spontaneously closed by exploiting the elasticity of the material downstream of the assembly 16, that is, the material of the tube 14 is elastic, and when the edges 22 and 23 are not held apart, they will naturally assume an abutting relation as shown in FIGS. 2 and 3 downstream of the tube 24 or the tube 25.

The fiber (or fibers) 11 continues in its straight path co-linear with the tube 14, the fiber 11 and the tube 14 constituting the unitary element 27 that is now wound around the bobbin 18.

The tube 14, passing through the rectilinear traction means 17 and owing to the first traction applied to it in that zone, comes under tension. Said tension can be defined as a "cutting" tension in the path that comprises at least the length 'a' between assembly 16 and the rectilinear traction means 17. This latter means moreover, acts exclusively on the tube 14, and the fiber 11 inserted in the tube 14 is not stressed at all.

The traction controlling device 26 puts under tension the tract 'b' of the tube 14, i.e. the portion between the device 26 and the rectilinear traction means 17, applying to it a second traction. Also, in this case, the fiber 11 is not loaded by any force since it is surrounded by the tube 14. Therefore, it is the tube 14 only, that undergoes the pull, and hence, the tract 'b' of the tube 14 can stretch in length with respect to the fiber (or fibers) 11. Thus, downstream of the traction controlling device 26, where tension on the tube 14 is removed and the tube 14 returns elastically to its own original dimension, the fiber 11 contained in it, has a greater length with respect to the tube 14 which, as has been pointed out before, permits the stressing of the unitary element, by traction, without stressing the fiber or fibers 11.

However, whenever the lengthening of the tube 14 which is produced in the tract 'a' by the rectilinear traction means 17, provides a sufficient excess length of fiber, the traction controlling device 26 can be omitted, and hence, the tube 14 can be utilized as already tension unloaded, downstream of the said rectilinear traction means 17. Alternatively, the said lengthening of the tube 14 can be obtained (in order to provide a greater relative lengthening of the fiber) directly during the collecting phase, by providing a traction controller (not illustrated) for the pull exercised by the collection bobbin 18 which acts in such a way as to put the tube 14 of the unitary element 27 under tension by operation of said traction controller.

As has been stated, the unitary element 27 can comprise a tube presenting a longitudinal cut equal to the thickness of the tube itself in the cutting plane, for example, along a generatrix, and also along any non-rectilinear line. The preferred line is a helicoidal line, such as the line 31 shown in FIG. 5, that could have, with respect to a rectilinear line, the advantage of better withstanding the curvature of coiling without any danger of the fiber (or fibers) escaping out of the tube 14.

The plant, for producing the latter type of unitary element, will have a feeder 13 for the tube 14, the rectilinear traction means 17 and the collecting means 18 which rotates, with a uniform movement, around an axis 29 (FIG. 1) lying on the rectilinear path of the said fiber (or fibers) 11 as indicated by the arrow 30. The means 18 will, of course, also rotate around the axis 19, and the assembly 16 will be stationary.

Although preferred embodiments of the present invention have been described and illustrated, it will be apparent to those skilled in the art that various modifications may be made without departing from the principles of the invention.

The embodiment of the invention in which an exclusive property or privilege is claimed are defined as follows:

1. A unitary optical cable element comprising a self-sustaining tube of elastic material enclosing one or more fibers, said tube having an inner wall of a diameter larger than the diameter of a circle circumscribing the fiber or fibers and having a longitudinally extending cut therein which extends from the outer surface of the tube to the inner surface of the tube and which provides a pair of tube wall edge faces at opposite sides of the cut, the resilient nature of said tube being such that it inherently assumes a tubular cross-section and presses said edge faces against each other.

2. A unitary optical cable element as set forth in claim 1 wherein the length of the fiber or fibers is greater than the unstretched length of the tube therearound.

3. An element as set forth in claim 1 wherein said cut is in a plane extending at an angle to a plane passing through the axis of said tube.

4. An element as set forth in claim 1 wherein said cut is in a plane radial to the axis of said tube.

5. An element as set forth in claim 1 or 4 wherein said cut is other than rectilinear.

6. An element as set forth in claim 5 wherein said cut is helicoidal.

7. An element as set forth in claim 1 or 6 further comprising a filler material occupying the space between said fiber or fibers and the inner surface of said tube.

8. An element as set forth in claim 1 wherein said cut is in a plane tangential to the inner surface of said tube.

* * * * *